United States Patent
Pena Villanueva et al.

(10) Patent No.: US 12,244,483 B1
(45) Date of Patent: Mar. 4, 2025

(54) NETWORK CONNECTION MONITORING

(71) Applicant: Amazon Technologies, Inc., Seattle, WA (US)

(72) Inventors: Alberto Pena Villanueva, Ashburn, VA (US); Ezequiel Lara Gomez, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/535,514

(22) Filed: Nov. 24, 2021

(51) Int. Cl.
*H04L 43/12* (2022.01)
*H04L 43/08* (2022.01)
*H04L 45/64* (2022.01)
*H04L 45/745* (2022.01)
*H04L 69/16* (2022.01)

(52) U.S. Cl.
CPC .............. *H04L 43/12* (2013.01); *H04L 43/08* (2013.01); *H04L 45/64* (2013.01); *H04L 45/745* (2013.01); *H04L 69/16* (2013.01)

(58) Field of Classification Search
CPC ......... H04L 43/12; H04L 43/08; H04L 45/64; H04L 45/742; H04L 69/16; H04L 43/18; H04L 41/5009; H04L 61/00; H04L 47/10; H04L 69/169; H04L 2101/663; H04N 21/2381; H04W 80/04
See application file for complete search history.

(56) References Cited

U.S. PATENT DOCUMENTS

| | | | |
|---|---|---|---|
| 7,920,558 B2 * | 4/2011 | He | H04L 45/00 370/389 |
| 2009/0106831 A1 * | 4/2009 | Wu | H04W 12/08 726/15 |
| 2014/0269380 A1 * | 9/2014 | Rusak | H04L 49/555 370/252 |
| 2015/0043348 A1 * | 2/2015 | Wang | H04L 47/125 370/235 |
| 2016/0142321 A1 * | 5/2016 | Gage | H04W 76/10 370/235 |
| 2017/0149582 A1 * | 5/2017 | Cohn | H04L 12/4633 |
| 2018/0054365 A1 * | 2/2018 | Lin | H04L 41/5003 |
| 2018/0241586 A1 * | 8/2018 | Li | H04L 45/036 |
| 2020/0177498 A1 * | 6/2020 | Thomas | H04L 45/24 |
| 2020/0351322 A1 * | 11/2020 | Magzimof | H04L 65/70 |
| 2021/0111999 A1 * | 4/2021 | Gandhi | H04L 43/0835 |
| 2021/0258347 A1 * | 8/2021 | Batta | H04L 63/0272 |
| 2021/0344650 A1 * | 11/2021 | Kondapavuluru | H04L 63/164 |
| 2021/0352000 A1 * | 11/2021 | Devaraj | H04L 45/70 |

* cited by examiner

*Primary Examiner* — Ian N Moore
*Assistant Examiner* — Latresa A McCallum
(74) *Attorney, Agent, or Firm* — Klarquist Sparkman, LLP

(57) ABSTRACT

In networks, some communication links may be provided as part of a network overlay. Technologies are disclosed for monitoring/analyzing targeted networks (e.g., network overlays) using probe packets sent from outside of the targeted networks/overlays. The probe packets are configured to include a stack of headers, including indications of UDP source ports, which are respectively examined in order at network devices in the targeted network to determine a routing scheme to utilize to route the packet.

20 Claims, 8 Drawing Sheets

NETWORK CONNECTION MONITORING

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies, such as equal-cost multi-path (ECMP) routing, which is a strategy where next-hop packet forwarding to a destination can occur over multiple best paths.

Latency and packet loss are important metrics for testing of a network. Network operations and engineering teams use latency and packet loss determinations to identify and fix network performance problems. The latency experienced between a network source and a network destination is determined by the sum of link propagation latencies for the links on the network path between them, and the sum of the switching and queuing latencies at each router hop that interconnects those links. Packet loss occurs when a packet transmitted from a source host server computer is not reached by a destination computer. Packet loss can occur for multiple reasons, such as dropped packets due to an overloaded buffer on a network switch. Both latency issues and packet loss can be identified and monitored using agents that transmit and receive test probes across the network.

DETAILED DESCRIPTION

Monitoring network metrics, such as packet loss and latency (e.g., round trip delay) helps to ensure continuous operation of the network according to expected performance characteristics by identifying and fixing network problems as they arise. One mechanism for monitoring network metrics includes sending probe packets through the network and analyzing payloads of such probe packets upon return to a monitoring service. However, in the case of network overlays (e.g., virtual private networks), performing such probe operations typically involves installing and connecting monitoring devices to the edges of the overlays. Depending on a size of the network overlay, such an endeavor may call for the deployment of a large number of such monitoring devices, increasing cost and complexity of the monitoring service.

The disclosure provides technologies that allow an application to monitor network performance metrics, such as packet loss and latency, on a network overlay between two or more locations from a third location (e.g., outside of the network overlay). By using a specially crafted routing policy, IP tunnel mechanisms, and a physical or virtual loop on a series of routers, the disclosed systems and methods may monitor loss and delay between any pair of points. In some examples, the disclosed technologies use Generic Routing Encapsulation over User Datagram Protocol (GRE-oUDP) encapsulation to send tunneled probe IP packets to an entry router on which the router performs a special lookup (e.g., policy routing or firewall filter). This lookup may remove an outer IP header and forward the traffic to an egress point based on an inner header (e.g., a UDP header, a GRE header, or a secondary IP header). At the egress, the router may have a similar policy by which the decision of whether to send the packet back to the source or keep "visiting" other hops may be controlled based on a source UDP port (or other indicator, such as a GRE key in the GRE header, a secondary IP address in the secondary IP header, etc.). At the last hop of a given probe path, which is controlled by the source crafting the different headers, the packet may be sent back to the source for delay and loss measurements. At the source, multiple headers may be added to the IP packet to traverse as many hops as desired in any sequence. In order to obtain an average delay and loss, the average round trip delay (RTD) and loss between the source and the entry point may be subtracted from the overall measurement determined based on the packet. The above and other features of the disclosed mechanisms for monitoring network performance in networks, which may include network overlays, are described in more detail below with respect to the corresponding figures.

Figure 1:
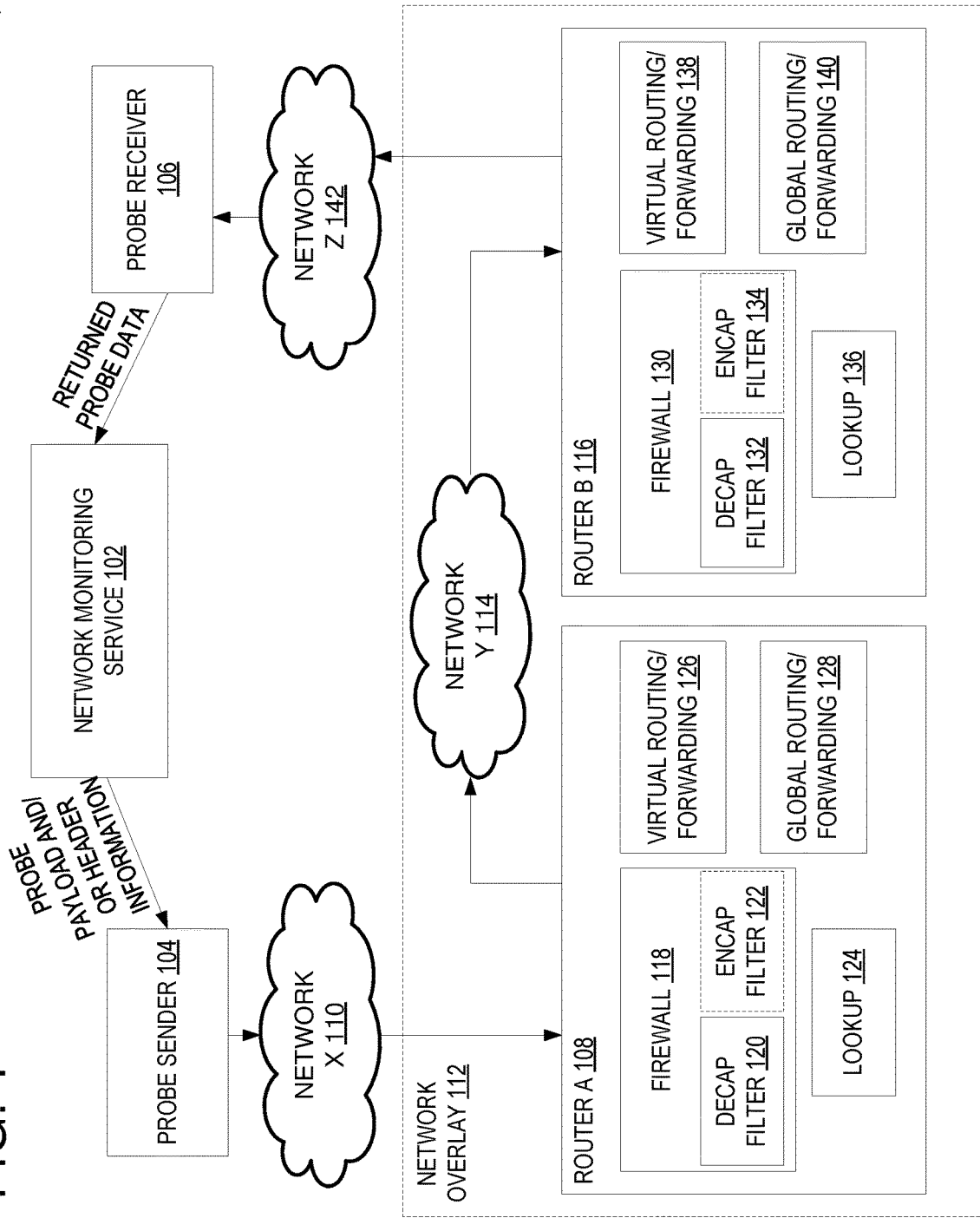
FIG. 1 is a block diagram of an example system for sending probes from outside a network overlay to measure metrics of the network overlay.

FIG. 1 shows an example system 100 for monitoring network performance, including latency and packet loss, for a network overlay using external probe devices. For example, a network monitoring service 102 may include a computing system configured to manage the sending and processing of probe packets through one or more networks using a probe sender 104 and/or a probe receiver 106. It is to be understood that, although a separate probe sender and receiver are illustrated in the example of FIG. 1, the technologies described herein may also be used for probe paths that start and end at the same device (e.g., the probe sender may send a probe out to traverse a path that ends back at the probe sender, etc.). In order to initiate the sending of a probe packet, the network monitoring service 102 may determine targeted ingress/egress devices (e.g., routers or other points of presence [POPs] communicating via networks for a network overlay) and generate payload and/or header information corresponding to the devices through which the probe packet is to traverse. For example, the network monitoring service 102 may generate a stack of headers for inclusion in the probe packet, where the stack of headers identifies devices in an order through which the probe packet is configured to pass through the devices.

As will be described in more detail below and with respect to the later figures, the header information may also be configured to specify a UDP source port (or other indicator, such as a GRE key or secondary IP address) having a value that is in one of a plurality (e.g., two) of ranges. Each range may correspond to a targeted routing/forwarding table that is to be used by an ingress/egress device to determine where to send the packet once received. For example, in a scenario where two ranges are utilized, a first range may be used to control the forwarding of the packet to another device in the network overlay or within a first routing domain/context, while a second range may be used to control the forwarding of the packet to an external device outside the network overlay or outside of the first routing domain/context (e.g., to exit the network overlay and arrive at the probe receiver [or sender, if the path is a return loop as described above]).

Responsive to receiving the probe payload and/or header information, the probe sender 104 may be configured to build a corresponding probe packet and send the probe packet to a first device indicated by a first header in the probe packet. In the illustrated example of FIG. 1, this first device may correspond to router A 108, which may be accessible via network X 110 and included in a network overlay 112 that also includes network Y 114 and router B 116. The networks X and Y (described below) and network Z (described below) may include any respectively suitable network, such as an IP network, multiprotocol label switching (MPLS) network, underlay network, overlay network, etc.

Router A 108 may include a firewall 118, which is configured with a decapsulating filter 120 and an encapsulating filter 122. When the probe packet from sender 104 is received at router A 108, the decapsulating filter 120 may remove or pop the outermost headers from the packet (e.g., the outermost GRE and UDP headers, which identify the router A as the first destination of the packet) and use a lookup 124 (e.g., a VPN lookup) to identify, via a virtual routing and forwarding (VRF) table 126 for the network overlay 112, a next IP header in the packet (e.g., which specifies a destination IP address of the next target for the packet; in this example router B 116). The router A 108 further includes a global routing and forwarding table 128, which may be used for looking up destinations for packets that are to be sent outside of the network overlay 112.

It is to be understood that, in some examples, the routers described herein include additional or alternative routing tables, such as multiple VRFs, which are selectively used based on the UDP source port (or other indicator, such as a GRE key) indicated in an incoming packet to route the packet to a next destination. Accordingly, while the selection of routing table in the illustrated example enables a router to selectively route packets through or outside of a network overlay based on a header of the packet, the description is equally applicable for examples in which the header of the packet is used to select different routing contexts/domains and for examples in which other indicators, such as the GRE key, are used to select the routing table/context/domain.

The encapsulating filter 122 is used to encapsulate the packet into a VPN label and corresponding transport (e.g., VPNv4) and send the packet to the destination (e.g., router B 116). It is to be understood that the encapsulating filter 122 is optional in some examples. For example, encapsulation may be performed by another component and/or may not be performed.

Router B 116 includes, similarly to router A 108, a firewall 130, which includes a decapsulating filter 132 and an encapsulating filter 134, as well as a lookup 136 and a VRF 138 and global routing and forwarding table 140, which are configured to perform the functions described above for the corresponding elements of router A 108. For example, upon receipt of the probe packet from router A 108 via network Y 114, the decapsulating filter 132 removes the header information relating to router B (e.g., the outermost header(s)) and examines one or more headers relating to a next destination device. In some examples, multiple lookups are performed using VRF(s) and/or global routing tables to process the headers. For example, the router B 116 uses lookup 136 (e.g., a multiprotocol label switching [MPLS] lookup) to identify the routing information for the destination indicated in a first header using virtual routing and forwarding table 138. The router B then uses a physical or logical loop (e.g., to allow the router to overcome restrictions with regard to a number of lookups that are able to be done in hardware) to control the packet to exit and re-enter the router B so that a second lookup can be performed based on the range of the UDP source port in the UDP header. In the illustrated example, the UDP source port is within a second range, so the router B 116 uses lookup 136 to identify the routing information for the destination using the global routing and forwarding table 140, which relates to the networks outside of network overlay 112. The encapsulating filter 134 may encapsulate the packet into a format for sending over network Z 142 to probe receiver 106.

The probe receiver 106, upon receiving the returned probe packet from router B 116 (via network Z 142), passes the probe packet to network monitoring service 102 for analysis. For example, the returned probe packet may include timestamps from one or more devices that received the packet along its path through the network overlay 112. For example, such timestamps may include a timestamp indicating a time of receipt by router A 108, a timestamp indicating a time of receipt by router B 116, and/or a timestamp(s) indicating time(s) of receipt at any intervening devices in network Y 114 through which the probe packet passed when travelling between router A 108 and router B 116. The timestamps may enable the network monitoring service to determine network metrics, such as latency, in the network overlay 112 by determining and/or comparing round trip delay/travel time measurements for one or more paths through the network overlay 112 based on the timestamps. For example, a difference between two timestamps in the return probe packet may indicate a travel time for the packet to traverse a corresponding path between the two devices that provided the timestamps. Comparisons of such travel time between the two devices over time (e.g., based on multiple probe packets sent through the network overlay 112) may be used to determine trends in network conditions (e.g., to identify when the time is increasing, indicating increased latency, etc.). The network metrics and/or information/instructions based thereon may be output to a user interface (e.g., a graphical user interface of a client device) and/or to another device for controlling operations of the network based on the determined metrics.

As shown in FIG. 1, the probe packets also travel pathways that extend outside of the network overlay 112 (e.g., paths between the probe sender 104 and router A 108 through network X 110, and paths between router B 116 and probe receiver 106 through network Z 142). Accordingly, the total travel time of the probe packet based on the timestamps may include delays that are not associated with the network overlay 112 (e.g., delays that are instead associated with outlying devices/networks). In order to compensate for these delays, the network monitoring service 102 may triangulate to subtract the loss/round trip delay between the network overlay 112 and the probe sender/receiver from the total determined loss/round trip delay indicated by a given probe packet. For example, packets having different stacks of headers may be sent into the overlay, including a packet that is configured to go into the network overlay (e.g., to a first router within the network overlay) and then directly back out of the network overlay (e.g., to a probe sender or receiver). The packet that is configured to go into the network overlay and then return without traveling further within the network overlay may be analyzed to determine a baseline round trip delay, which may be subtracted from round trip delays for other probe packets to determine a round trip delay that is attributed to the network overlay.

Figure 2:
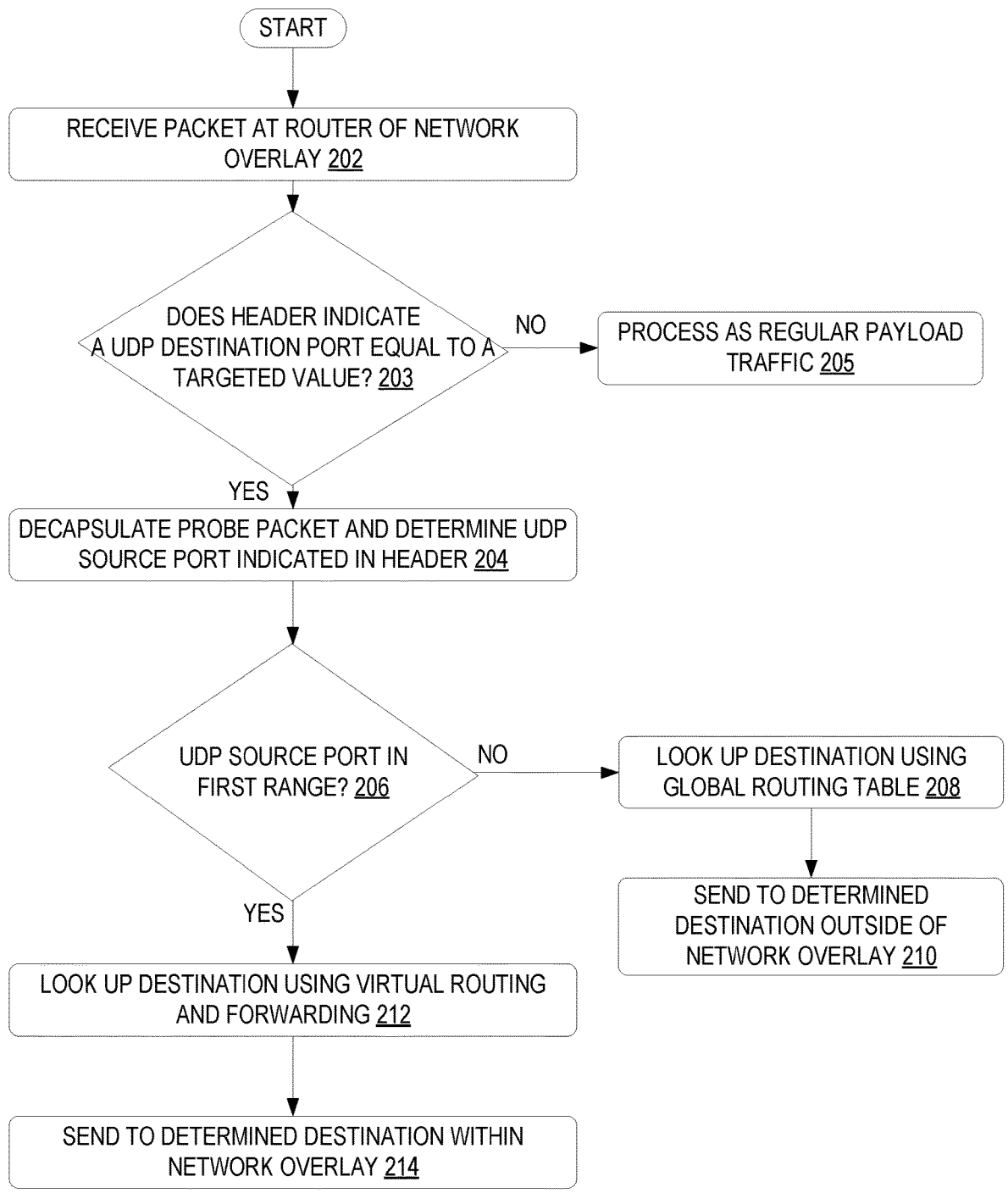
FIG. 2 is a flow chart of an example method of routing probe packets based on stacked headers in the packets.

FIG. 2 is an example method 200 for processing packets at a router of a network based on stacked headers inside of the packet. Method 200 may be performed by one or more processors of a router (e.g., router A 108 and/or router B 116 of FIG. 1) to process probe packets received from outside a network overlay (e.g., network overlay 112 of FIG. 1) that includes the router. At 202, the method includes receiving a packet at a router of a network overlay. For example, the packet may be received from another router in the network overlay or from an external source outside of the network overlay.

At 203, the method includes determining if a header (e.g., an outermost UDP header of the packet) indicates a UDP destination port that is equal to or otherwise corresponds to a targeted value (e.g., 4754). The targeted value may indicate that the packet is a probe packet that is to be routed based on a UDP source port as described in more detail below, starting at operation 204. If the header does not indicate a UDP destination port that is equal to the targeted value (e.g., if the header does not include a UDP header and/or includes a UDP header specifying a different destination; "NO" at 203), the method includes processing the packet as regular payload traffic, as indicated at 205. The processing performed at 205 may include performing operations based on the configuration of the router and the content of the packet, and may include operations such as discarding the packet, replying to the packet, forwarding the packet, storing data from the packet, etc.

If the header indicates a UDP destination port equal to the targeted value (e.g., "YES" at 203), the method includes, at 204, decapsulating the probe packet and determining a UDP source port indicated in an outermost header of the packet. As described above, UDP source ports may be used to determine which lookup/routing table to use to determine a next destination for the packet. Accordingly, at 206, the method includes determining if the UDP source port is in a first range. The first range may be preconfigured based on a number of lookup/routing table options can be used for the packet. For example, if the router includes two lookup/routing table options (e.g., a VRF and a global routing table, as described above with respect to FIG. 1), the first range may include half of the total possible UDP source port values and a second range may include a remaining half of the total possible UDP source port values. In another example, if the router includes two VRFs and a global routing table, the first range may be a third of the total possible UDP source port values. Similar portioning may be performed to determine the ranges for other numbers of lookup/routing table options for a given router/network overlay, where each range of UDP source port values is associated with a corresponding lookup/routing table to be used to forward/route packets. In some of the above examples, the ranges corresponding to the different lookup/routing tables may not be equally distributed (e.g., the number of UDP source port values in each range may be selected based on a number of paths a packet can be routed using the corresponding lookup/routing table relative to other lookup/routing table options for the router).

If the UDP source port is not in the first range (e.g., "NO" at 206), the method includes looking up a destination for the packet using a global routing table, as indicated at 208. As described above, method 200 provides one example in which a global routing table and VRF are used depending on a range in which a UDP source port value of an outermost header of the packet falls. However, it is to be understood that in other examples, a different associated routing table may be used, as described above. In such examples, each routing table/lookup is associated with a different range of UDP source port values, and the packet is forwarded using the routing table/lookup that is associated with the range in which the UDP source port value is located. Continuing with FIG. 2, the method includes sending the packet to the determined destination (e.g., determined using the global routing table at 208) outside of the network overlay, as indicated at 210.

If the UDP source port is in the first range (e.g., "YES" at 206), the method includes looking up a destination for the packet using a VRF, as indicated at 212. At 214, the method includes sending the packet to the determined destination within the network overlay. In this way, the UDP source port in the header may be used to selectively direct the packet within the network overlay or outside the network overlay. As described above, although the example of FIG. 2 discloses using a UDP source port for routing table selection for illustrative purposes, the disclosed processes are also applicable to examples in which a GRE key is used instead of or in addition to the UDP source port for routing table selection (e.g., in such examples, the GRE key is compared to the range or a first value at 206).

Figure 3:
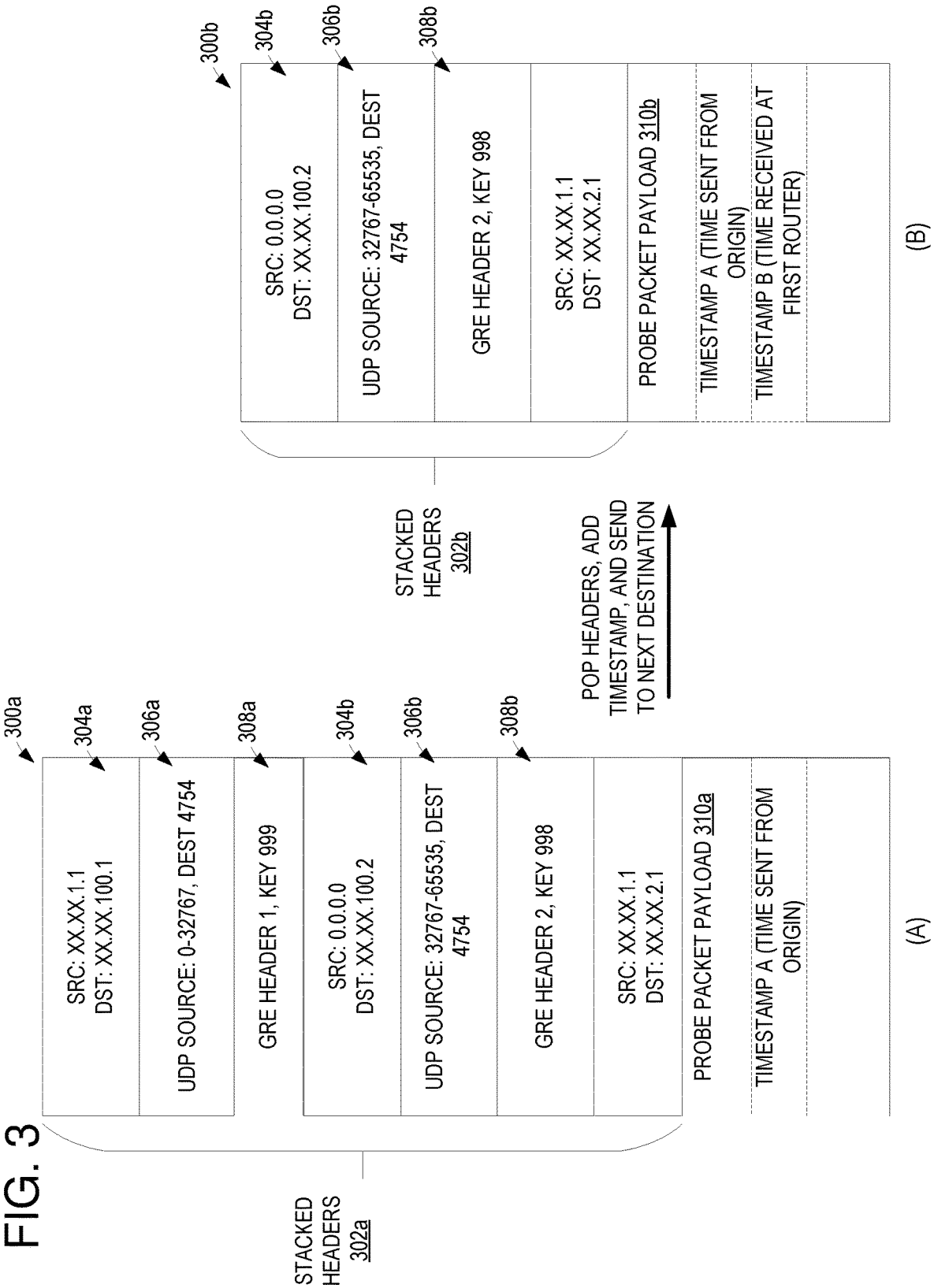
FIG. 3 shows example contents of a probe packet including stacked headers as the packet is transmitted between routers in a network.

In order to provide UDP source port-based routing described above, the packet may include a stack of headers arranged in an order based on a selected path that the packet is to travel. The headers that include UDP source port indicators for routing purposes may also be sequentially removable, or "popped," when received by a receiving device to expose a next header that includes UDP source port information corresponding to a next destination. FIG. 3 schematically shows an example packet structure for a packet at different stages along a traversal of a communication path (e.g., a path between a probe sender and a probe receiver through a network overlay, an example of which is shown and described above with respect to FIG. 1). For example, packet structure 300a shows example contents of a packet when received at a first device, and packet structure 300b shows example contents of the packet when received at a second device (e.g., after the packet is processed and sent out by the first device). It is to be understood that the content of the packets shown in FIG. 3 are provided for illustrative purposes in relation to the UDP source port based routing described herein, and additional headers/payload/etc. may be included in packets (e.g., probe packets) transmitted according to the described mechanisms without departing from the scope of this disclosure.

As shown in packet 300a of FIG. 3, a stack of headers 302a includes multiple headers configured to control a forwarding of the packet through one or more networks in order to measure metrics of communication links within the one or more networks. For example, for each destination, the stack of headers includes a respective corresponding IP header (e.g., IPv4 header 304a), UDP header (e.g., UDP header 306a, which may include an indication of a UDP source port and a destination), and GRE header (e.g., GRE header 308a, which may include an indication of a GRE key). It is to be understood that in other examples that utilize other communication protocols, additional, fewer, and/or different combinations of headers may be used in the stack of headers.

In the stacked headers 302a of packet 300a, the first set of headers (e.g., the outermost headers 304a, 306a, and 308a) are used to route the packet to the next destination (e.g., a second router), and are popped off (e.g., removed from the packet, moving a next set of headers, such as headers 304b, 306b, and 308b to become the outermost headers) by the router that received the packet (e.g., a first router) after evaluation and before forwarding the packet. As described above, the UDP header 306a is used to determine a lookup/routing scheme or table to use to forward the packet. For example, a range of the UDP source port indicated in UDP header 306a is compared to two or more predefined ranges to determine in which range the source port is included. In the illustrated example, the UDP source port indicated in UDP header 306a is in the range of 0-32767 (e.g., although shown as a range for illustrative purposes the UDP source port indicated by the UDP header 306a may be a value within that range), which in this example is associated with a VRF used by the router that received the packet 300a.

Accordingly, the first router, for example, pops off headers 304a, 306a, and 308a and sends the packet (which is now in the form of packet 300b) to a next destination (e.g., a second router) using the VRF to lookup the destination identified by the IPv4 header 304a (e.g., the packet being routed through a network overlay). Before sending the packet, the first router may, in some examples, also add a timestamp to payload 310a (shown as including a timestamp A of a transmission time from the origin, such as a probe sender), which is reflected in packet 300b as timestamp B in payload 310b. Although shown as a receipt time, it is to be understood that timestamp B may alternatively correspond to a time of transmission from the router that received packet 300a and/or an additional timestamp corresponding to the time of transmission may be added to the payload of the packet before sending it out to a targeted destination (e.g., the second router).

Upon receipt by the targeted destination (e.g., the second router), the packet 300b is decapsulated by the second router, whereby the second router looks up the addresses in the IPv4 header 304b and/or GRE header 308a (or another header that includes a routing address) using a routing table selected based on the UDP source port indicated in UDP header 306b (and/or the GRE key in GRE header 308a in some examples). In the illustrated example, the UDP source port indicated in the UDP header 306b is in the range of 32767-65535, which in this example is associated with a global routing table used to route packets outside of the network overlay. Accordingly, the second router pops off the headers 304b, 306b, and 308b and sends the modified packet (including in the payload an additional timestamp(s) indicating a time of receipt and/or transmission at the second router) to a destination outside of the network overlay based on the address (e.g., the destination address) in IPv4 header 304b and/or GRE header 308b.

Figure 4:
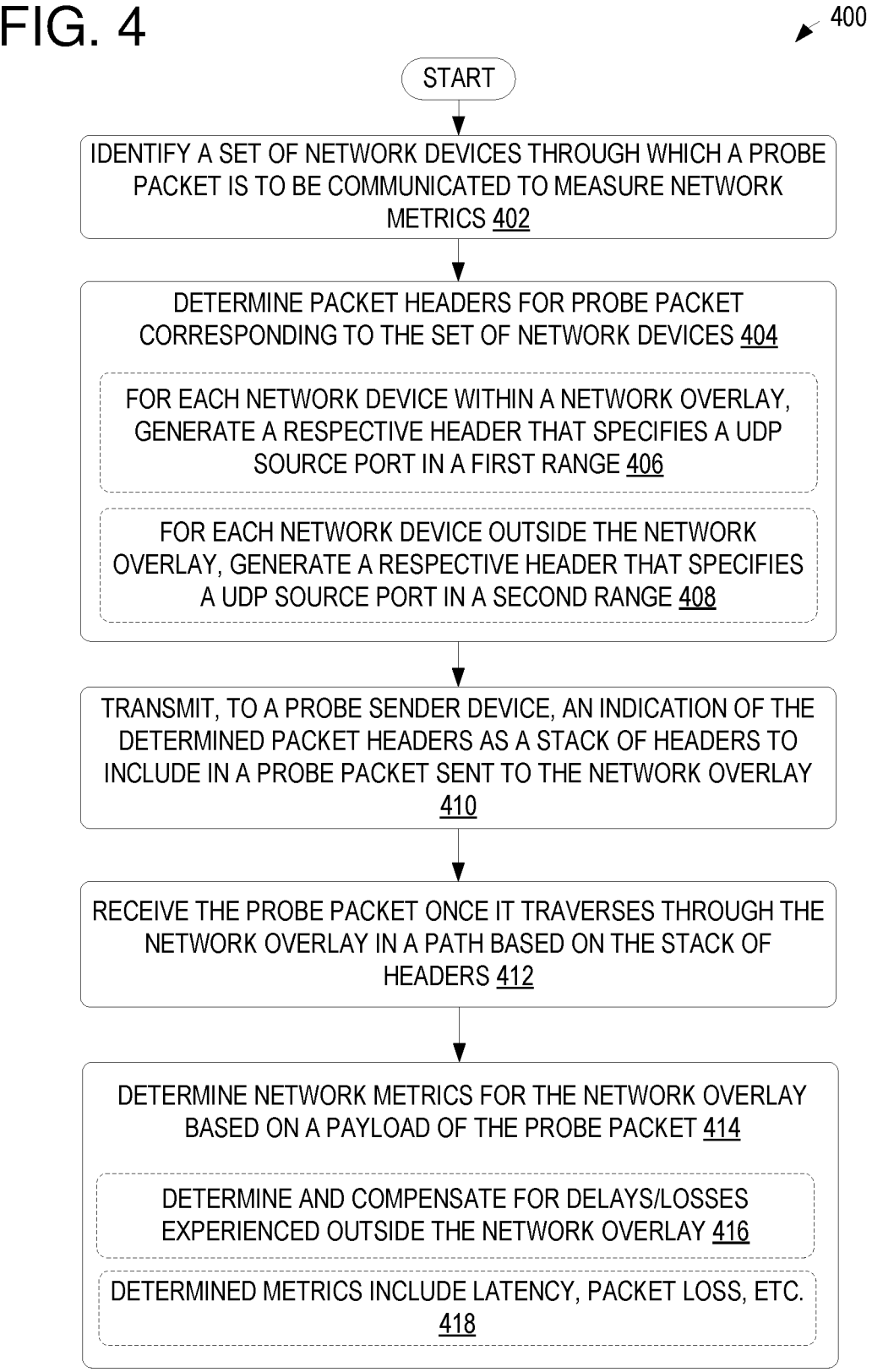
FIG. 4 is a flow chart of an example method of managing the transmission of probe packets through a network overlay to monitor network connections in the network overlay.

FIG. 4 is a flow chart of an example method 400 for managing the transmission of probe packets through a network overlay from outside of the network overlay. For example, method 400 may be performed by a network monitoring service (an example of which is described above with respect to network monitoring service 102 of FIG. 1) using a probe sender and/or probe receiver (e.g., positioned outside of a target network overlay) to send probe packets through the target network overlay. At 402, the method includes identifying a set of network devices through which a probe packet is to be communicated to measure network metrics. The network devices may include routers (e.g., inside or outside the target network overlay), probe sender/receiver devices, and/or other devices. Although referred to as network devices in the described example, it is to be understood that in some examples, a lower level of granularity may be used to set the path of the packet, and the network monitoring service may include groups of devices and/or networks in the identified set.

At 404, the method includes determining packet headers for the probe packet corresponding to the set of network devices identified at 402. For example, for each network device within the target network overlay, a respective header may be generated, which specifies a UDP source port in a first range, as indicated at 406. For each network device outside the network overlay, a respective header may be generated, which specifies a UDP source port in a second range (e.g., different from and/or non-overlapping with the first range), as indicated at 408. As described above, in other examples, more than two ranges of UDP source ports may be used to differentiate between more than two routing schemes/tables, and/or the UDP source port ranges may be mapped to different routing domains/contexts other than routing outside versus inside network overlays. As further described above, in other examples, another indicator in the headers such as GRE keys may be used to differentiate between and/or select the routing schemes/tables in the same manner as described above with respect to the UDP source ports.

At 410, the method includes transmitting, to a probe sender device, an indication of the determined packet headers as a stack of headers to include in a probe packet to be sent to the network overlay. In some examples, the transmission at 410 may include sending the probe packet, including the stack of headers and a payload (an example of the structure of the probe packet is described in more detail above with respect to FIG. 3), to the probe sender device. In such examples, the probe sender device may add a timestamp to the payload to indicate a transmission time and transmit the probe packet toward the first destination/network device indicated via the outermost header of the stack of headers.

At 412, the method includes receiving the probe packet, for example once it traverses through the network overlay in a path based on the stack of headers. For example, the probe packet may be transmitted between network devices as described above with respect to FIG. 2, such that each device pops off a header, reads the UDP source port associated with the next header, and uses a routing table/lookup that is selected based on a range in which the UDP source port is included to route the packet to a next destination. A final destination may be a probe receiver (or the probe sender, if the path is configured to be a return loop path), which provides the probe packet to the network monitoring service for evaluation (e.g., determination of metrics of the network overlay, described below).

At 414, the method includes determining network metrics for the network overlay based on a payload of the probe packet (e.g., the probe packet received at 412). As indicated at 416, the method may include determining and compensating for delays and/or losses experienced outside the network overlay. For example, as described above, a total round trip delay may be calculated from the payload of the packet (e.g., using the timestamps to determine a length of time that elapsed between sending the packet via the probe sender device and receiving the packet at a probe receiver device/the probe sender device (e.g., in examples where the packet is sent and received from the same device)). A delay attributed to communications outside the network overlay may be estimated (e.g., as described in more detail above) and subtracted from the total round trip delay in order to compensate for such losses. As indicated at 418, the determined metrics may include any suitable network/network device metrics, including latency, packet loss, and/or other metrics derived from the payload of the packet.

Figure 5:
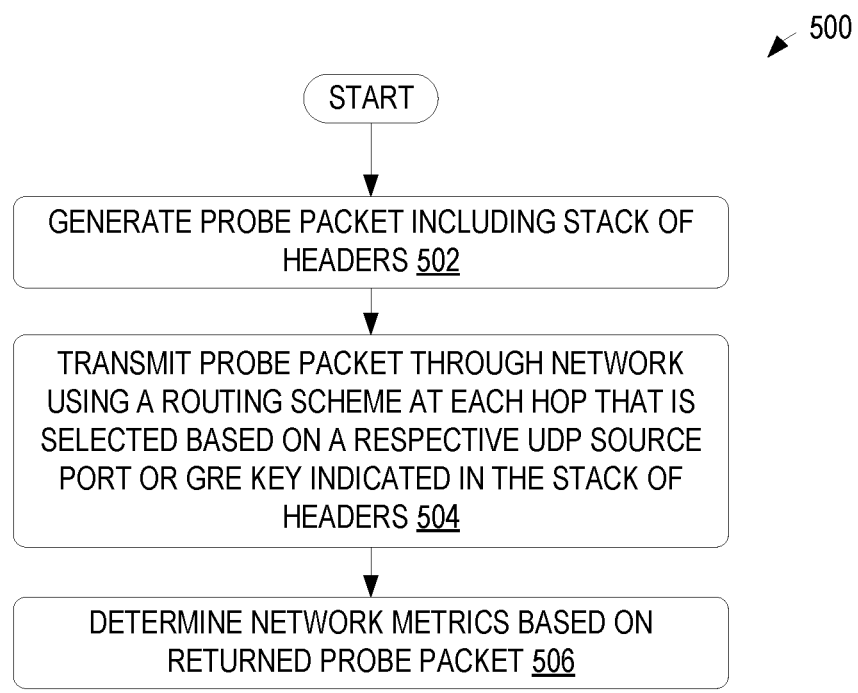
FIG. 5 is a flow chart of an example method of monitoring a network using probe packets with stacked headers.

FIG. 5 is a flow chart of an example method 500 of monitoring a network using probe packets with stacked headers. The method 500 may be performed by a network monitoring service (an example of which is described above with respect to network monitoring service 102 of FIG. 1) using a probe sender and/or probe receiver (e.g., positioned outside of a target network overlay) to send probe packets through the target network overlay. At 502, the method includes generating a probe packet including a stack of headers. As described above and in more detail with respect to FIG. 3, the stack of headers may include respective UDP source port indicators and/or GRE headers for each of a plurality of hops along a targeted communication path through the target network overlay.

The method further includes transmitting the probe packet through the network (e.g., the network overlay) using a routing scheme at each hop/network device along the communication path, where the routing scheme is selected based on a respective UDP source port or GRE key indicated in the stack of headers, as indicated at 504. For example, the routing scheme or table may be selected based on a range in which the UDP source port and/or GRE key falls, as described in more detail above (e.g., with respect to FIG. 2). At 506, the method includes determining network metrics based on the returned probe packet. For example, as described above, once the probe packet has been transmitted along the targeted communication path and ends at a probe receiver (or back at the probe sender if the path is a looped path), the probe packet is examined by the network monitoring service to determine metrics of the network overlay. By examining multiple probe packets in this manner (e.g., by repeating method 500 over time for multiple probe packets), real-time and/or trending metrics such as latency/round trip delay, packet loss, etc. for the network overlay may be estimated by the network monitoring service.

Figure 6:
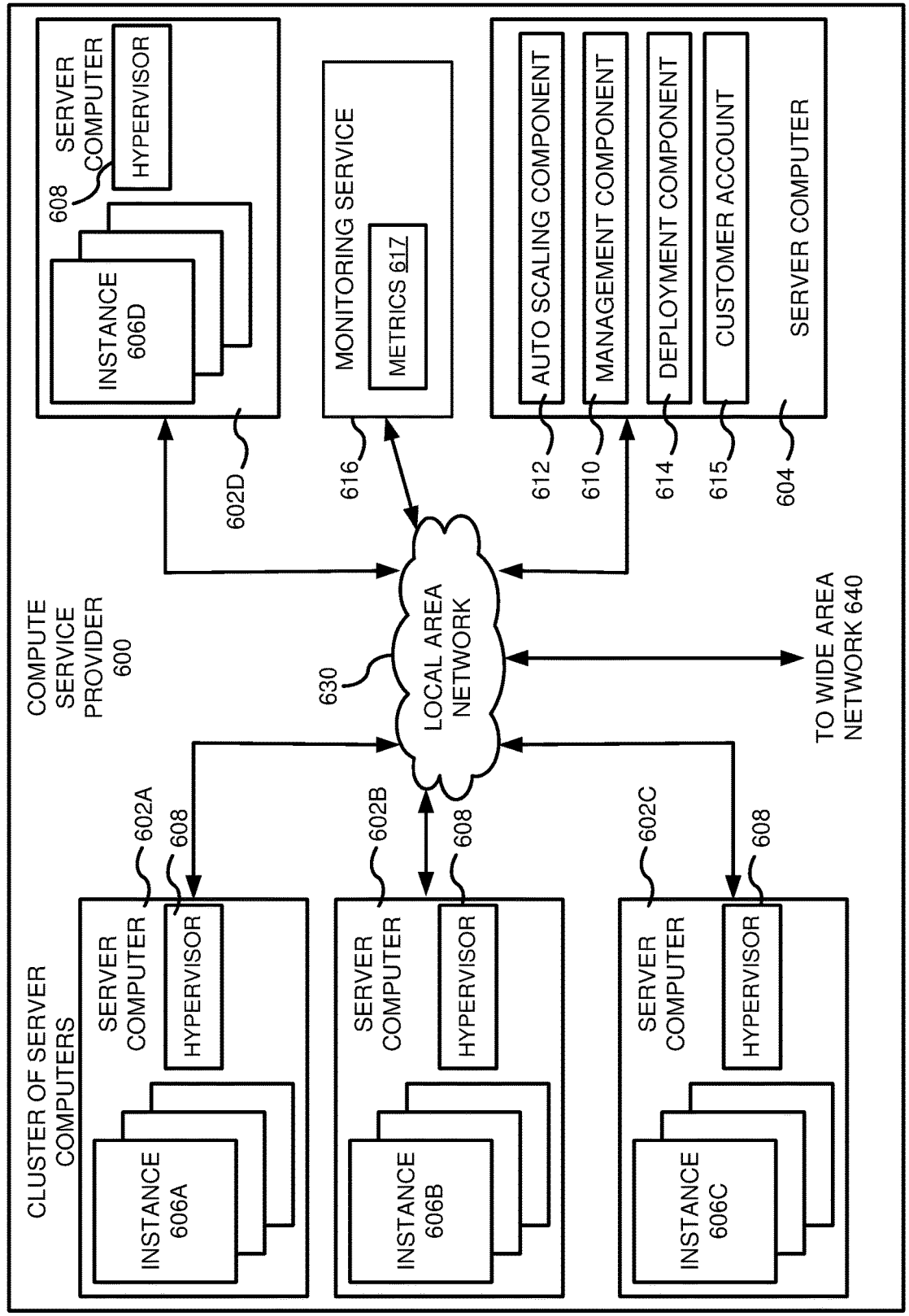
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. In some examples, one or more of the monitoring service 102 and/or the routers 108/116 of FIG. 1 is used and/or included in a cloud environment such as the environment of FIG. 6. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. In some examples, the server computer may include components for managing and/or interfacing with the monitoring technologies described herein. In such examples, the components of the server computer may include tools that access devices in the network (e.g., the other server computers 602A-602B and/or routers or other network devices in the local area network 630 and/or wide area network 640). For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

Monitoring service 616 may include components for implementing the network monitoring technologies described herein, such as the monitoring service 102 of FIG. 1. For example, monitoring service 616 may manage the generation and processing of probe packets using computing resources distributed among the server computers 602 and/or other components in accordance with the methods and systems described herein. Monitoring service 616 may also include a metrics database 617 configured to store metrics information determined based on the responses to the probe packets and/or other metrics information for the network.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
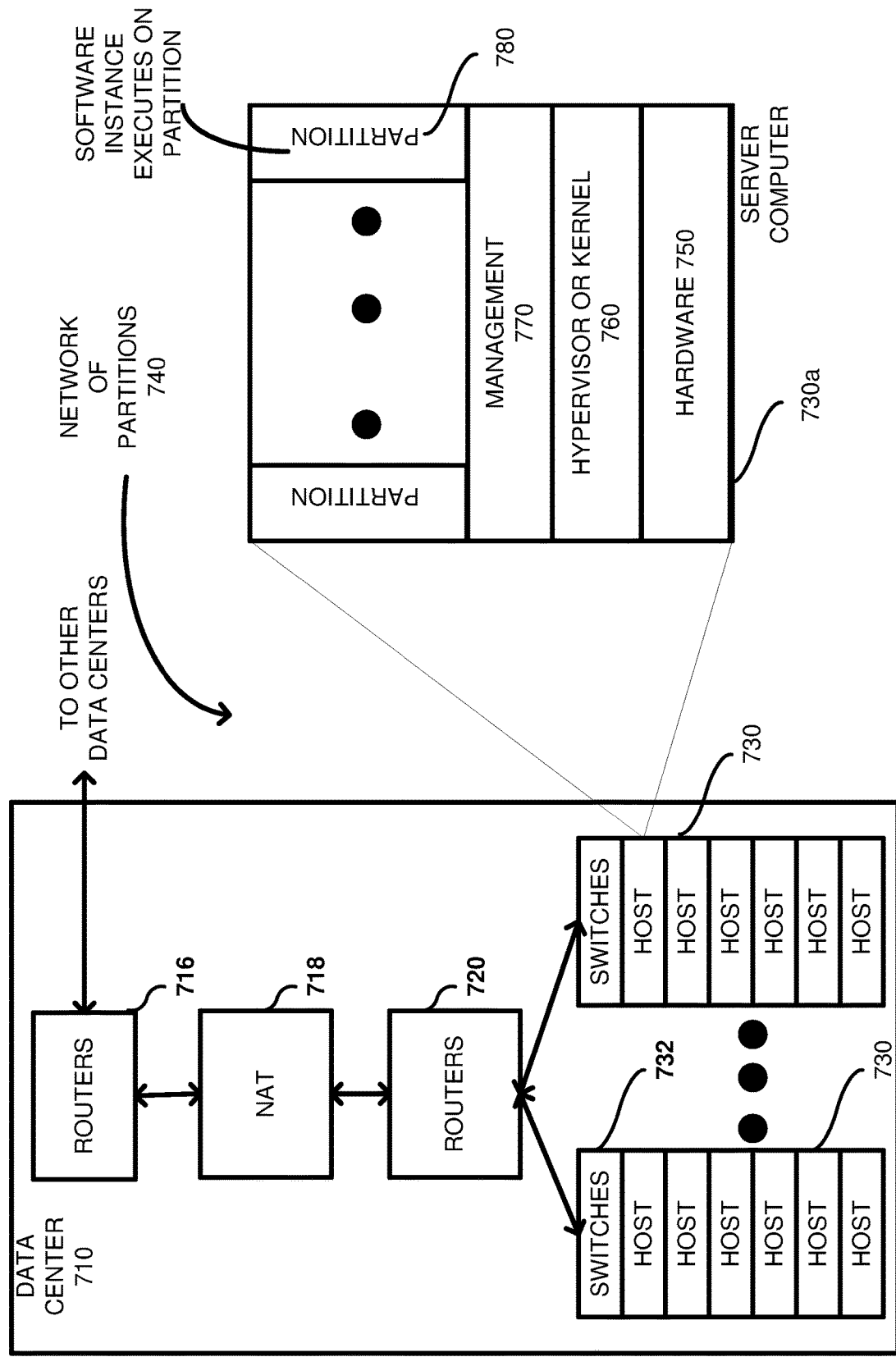
FIG. 7 shows an example of a plurality of host computers, routers and switches, which are hardware assets used for running virtual machine instances.

FIG. 7 illustrates a network of partitions 740 and the physical hardware associated therewith. The network of partitions 740 can include a plurality of data centers, such as data center 710, coupled together by routers 716. The routers 716 read address information in a received packet and determine the packet's destination, for example, based on stacked headers as described herein. If the router decides that a different data center contains a host server computer, then the packet is forwarded to that data center. If the packet is addressed to a host in the data center 710, then it is passed to a network address translator (NAT) 718 that converts the packet's public IP address to a private IP address. The NAT also translates private addresses to public addresses that are bound outside of the datacenter 710. Additional routers 720 can be coupled to the NAT to route packets to one or more racks of host server computers 730. Each rack 730 can include a switch 732 coupled to multiple host server computers. A particular host server computer is shown in an expanded view at 730a.

Each host 730 has underlying hardware 750 including one or more CPUs, memory, storage devices, etc. Running a layer above the hardware 750 is a hypervisor or kernel layer 760. The hypervisor or kernel layer can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 770 can be part of the hypervisor or separated therefrom and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 770, which can then pass the metrics to a client monitoring service, such as monitoring service 616 of FIG. 6, for storage in a metrics database, such as metrics database 617 of FIG. 6. Additionally, the management layer 770 can pass to the monitoring service the number of instances that are running, when they were launched, the operating system being used, the applications being run, etc. All such metrics can be used for consumption by a health monitoring service and stored in a corresponding database.

Figure 8:
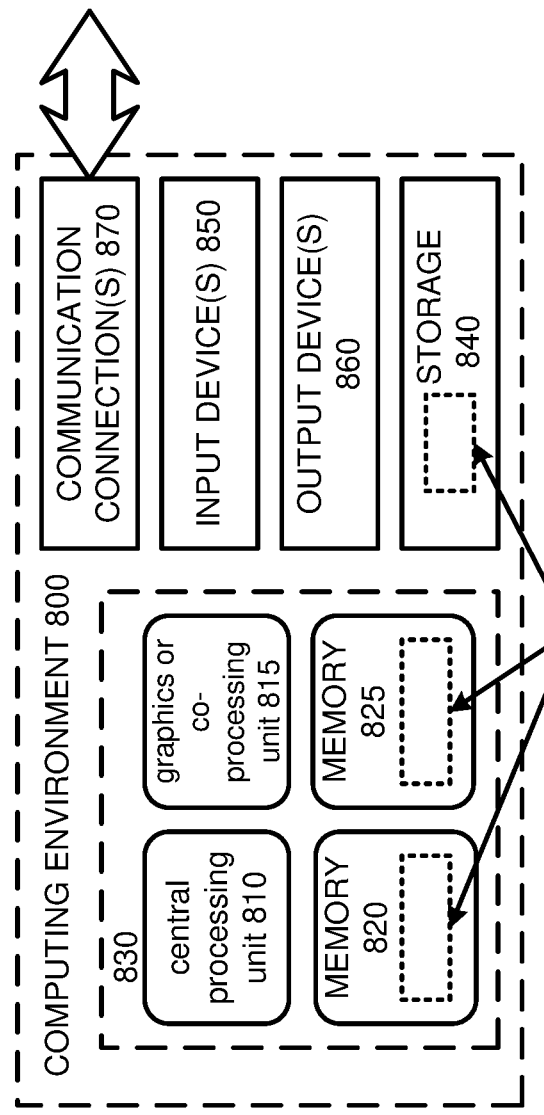
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer system comprising:
   memory for storing executable instructions; and
   one or more processors that execute the instructions to:
      determine packet headers for a probe packet, the packet headers corresponding to a set of network devices through which the probe packet is to be communicated, wherein the packet headers include User Datagram Protocol (UDP) packet headers indicating a respective UDP source port corresponding to a network device of the set, and wherein the respective UDP source port is selected based on whether the network device is within a network overlay, wherein the respective UDP source port is within a first range for network devices within a network overlay or within a second range for network devices outside of the network overlay, and wherein the UDP packet headers with UDP source ports in the first range are configured to cause a receiving device to use a different routing table than the UDP packet headers with UDP source ports in the second range;
      transmit, to a probe sender device, an indication of the determined packet headers as a stack of headers to include in the probe packet;
      receive the probe packet after traversal of the probe packet through a network overlay in a path based on the stack of headers;
      determine network metrics for the network overlay based on a payload of the received probe packet; and
      output an indication of the determined network metrics.

2. The computer system of claim 1, wherein determining the network metrics includes determining latency or packet loss in the network overlay based on timestamps included in the payload of the received probe packet.

3. The computer system of claim 2, wherein determining the latency or packet loss further comprises determining delays or losses experienced outside of the network overlay and adjusting the determined latency or packet loss to compensate for the de lays or losses experienced outside of the network overlay.

4. The computer system of claim 1, wherein the probe sender device is located outside of the network overlay.

5. The computer system of claim 1, wherein the UDP packet headers with UDP source ports in the first range are configured to cause the receiving network device to lookup a next destination using a virtual routing and forwarding table and the UDP packet headers with UDP source ports in the second range are configured to cause the receiving network device to lookup a next destination using a global routing table.

6. A method comprising:
generating a probe packet including a stack of headers;
transmitting the probe packet through a network using a respective selected routing scheme at a plurality of router devices, wherein the respective selected routing scheme at each router device of the plurality of router devices is selected from two or more routing schemes based on a respective User Datagram Protocol (UDP) source port or a respective generic routing encapsulation (GRE) key indicated in a corresponding header of the stack of headers, wherein using the respective selected routing scheme comprises using a routing table that is selected from a plurality of routing tables based on a range of values in which the respective UDP source port or the respective GRE key is included, and wherein the range of values in which the UDP source port or the respective GRE key is included is used to differentiate between the plurality of routing tables; and
determining and reporting network metrics based on the probe packet after the probe packet is routed through at least one of the plurality of router devices.

7. The method of claim 6, wherein the stack of headers includes, for each router device through which the probe packet is to be transmitted, a respective IP header indicating a respective address and a respective UDP header indicating the respective UDP source port.

8. The method of claim 7, wherein the stack of headers further includes, for each router device through which the probe packet is to be transmitted, a respective GRE header indicating the respective GRE key.

9. The method of claim 7, wherein, for each hop along a communication path through the network, the probe packet is transmitted to the respective address using the selected routing scheme based on the respective UDP source port or the respective GRE key.

10. The method of claim 9, wherein the selected routing scheme includes using a virtual routing and forwarding table to route the probe packet to the respective address in response to the UDP source port or GRE key being in a first range of values.

11. The method of claim 9, wherein the selected routing scheme includes using a global routing table to route the probe packet to the respective address in response to the UDP source port or GRE key being in a second range of values.

12. The method of claim 6, wherein the network includes a network overlay and wherein the probe packet is transmitted from a probe sender located outside of the network overlay, and wherein the respective UDP source ports in the headers are configured to be within a first range to designate a respective destination within the network overlay and configured to be within a second range to designate a respective destination outside of the network overlay.

13. The method of claim 12, wherein determining the network metrics includes determining latency or packet loss in the network overlay.

14. The method of claim 13, wherein the latency or packet loss is determined based on one or more timestamps included in a payload of the probe packet.

15. The method of claim 14, wherein determining the latency or packet loss includes determining delays or losses experienced outside of the network overlay and adjusting the determined latency or packet loss to compensate for the delays or losses experienced outside of the network overlay.

16. The method of claim 12, wherein the probe packet is configured to be sent from a probe sender located outside of the network overlay and returned to the probe sender or to a probe receiver located outside of the network overlay.

17. One or more non-transitory computer-readable storage media comprising computer-executable instructions that, when executed, cause a computing system to perform a method comprising:
receiving a probe packet including a stack of headers;
determining a destination port in the stack of headers; and
responsive to determining that the destination port corresponds to a targeted value:
decapsulating the probe packet and determining a User Datagram Protocol (UDP) source port indicated in a selected header of the stack of headers,
determining a range in which the UDP source port is included,
looking up a next hop for the probe packet using a routing table that is selected from a plurality of routing tables based on the range in which the UDP source port is included, wherein the range in which the UDP source port is included is used to differentiate between the plurality of routing tables, and
sending the probe packet to the next hop.

18. The one or more non-transitory computer-readable storage media according to claim 17, wherein the determined range is one of a first range or a second range, and wherein, when the determined range is the first range, the routing table is a virtual routing and forwarding table and the probe packet is sent to the destination within a network overlay, and when the determined range is the second range, the routing table is a global routing table and the probe packet is sent to the destination outside of the network overlay.

19. The one or more non-transitory computer-readable storage media according to claim 18, wherein decapsulating the probe packet includes removing one or more headers from the stack of headers to form an updated version of the probe packet, and wherein sending the probe packet to the destination comprises sending the updated version of the probe packet to the destination.

20. The one or more non-transitory computer-readable storage media according to claim 19, wherein the updated version of the probe packet further includes one or more timestamps indicating a receipt time that the probe packet was received or a transmission time that the updated version of the probe packet was sent to the destination.

\* \* \* \* \*